Oct. 25, 1960  W. T. SHINN  2,958,042
FABRICATION OF SEMICONDUCTORS AND THE LIKE
Filed Sept. 23, 1958
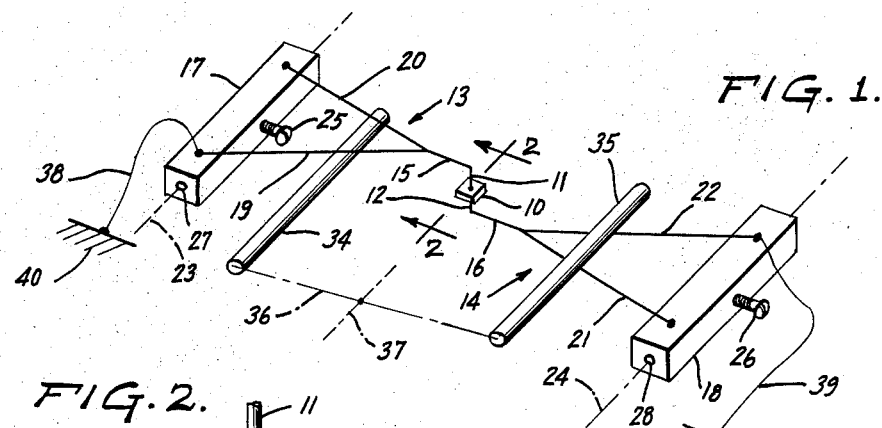
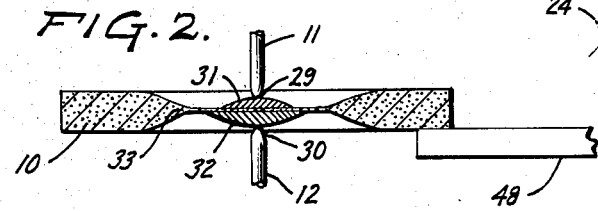
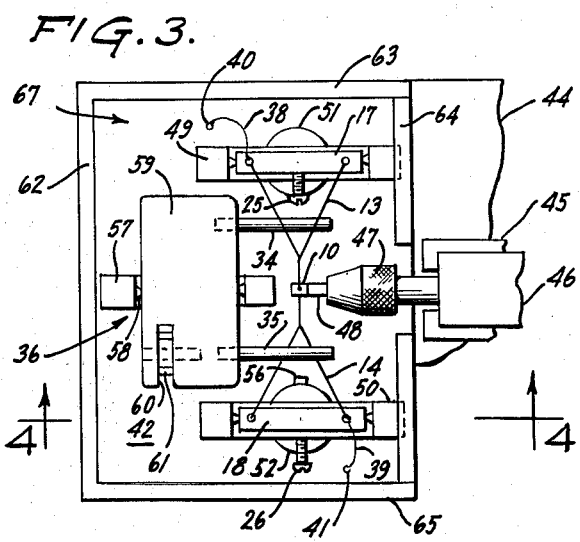
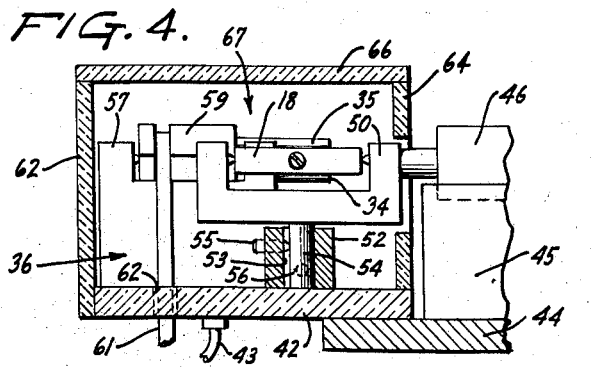
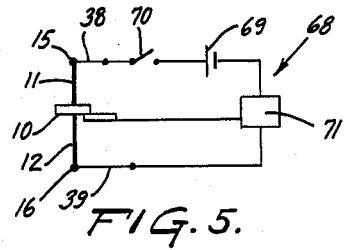
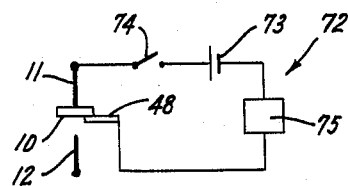
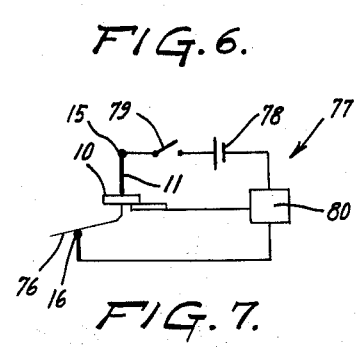
INVENTOR.
WILLIAM T. SHINN
BY
F. D. Rago
ATTORNEY & # United States Patent Office 2,958,042
Patented Oct. 25, 1960

2,958,042

FABRICATION OF SEMICONDUCTORS AND THE LIKE

William T. Shinn, Waltham, Mass., assignor to Philco Corporation, Philadelphia, Pa., a corporation of Pennsylvania Filed Sept. 23, 1958, Ser. No. 762,853

8 Claims. (Cl. 324—158)

This invention relates to the testing of semi-conductor devices and the like and particularly to apparatus for applying non-destructive tests to small, delicate transistor or diode blanks.

In the fabrication of transistors, diodes, etc., it is desirable at various stages to apply electrical tests, either manually or automatically. It is a primary object of the invention to provide instrumentation whereby such tests can readily be performed.

It is a further object to provide a test probe actuator which can operate rapidly, without much attention by operators or process supervisors, and particularly, without damage to the transistor under test. Hitherto, difficulty has been encountered in this last-mentioned respect. So minute and so fragile are certain types of the units to be tested that the mere operation of applying testing probes has proven fatal to them, even when considerable caution was exercised.

It is therefore a further and particular object of the invention to provide testing contactor means wherein adequate contact pressures can be applied gently and safely and yet positively, as well as without undue delay. Heretofore, a variety of devices has been proposed and/or tried for such purposes, starting with simple test stands for manual application of test probes. More recently, an automatically and rapidly operable arrangement, employing solenoid-operated spring supports for test needles, has been disclosed in Patent No. 2,872,645 of S. Santamaria and A. R. Topfer, assigned to the assignee of this invention. However, problems have remained. No matter how yieldingly and cautiously the probes were moved, it was found difficult, at least in the case of some types of transistors, to avoid breakage and/or delay incident to the testing.

Vastly improved results have now been achieved. In a simple embodiment of the invention, a pair of contactor needles, symmetrically aligned with the center of a horizontally held transistor blank, are supported by or preferably integrally formed on, a pair of horizontal arms, one extending from above and the other from below the transistor blank. The arms are disposed for small rocking or tilting motions toward the blank, enforced by means for applying what will be called a "static" force to the arms, that is, a force which does not substantially increase and mainly does not fluctuate during such motions. Such a force is most suitably derived from a weight, adjustably mounted on each arm structure. It is further preferred to make the arms very light and to make them relatively resilient in the direction of their movement, but relatively rigid in other directions. No use is made of complex or dynamic power means of any kind, except possibly for the auxiliary purpose of symmetrically withdrawing and then simultaneously releasing the two arms. These and associated structures will now be considered more fully.

Figure 1 is a perspective view, taken on a slightly enlarged scale, of apparatus incorporating the present invention, some parts of said apparatus being shown in purely schematic form in this view. Figure 2 is a greatly enlarged section taken along line 2—2 in Figure 1, the transistor being shown in this figure as being at that stage of the fabrication cycle where it has been basically formed, etched down locally, and provided with electrodes. Figure 3 is a full-scale plan view of the apparatus; Figure 4 is a section taken along line 4—4 in Figure 3; and Figures 5 to 7 are diagrams of different electrical connections which may form part of the apparatus.

As shown in Figure 1, transistor 10 has generally flat upper and lower sides, horizontally disposed and contacted respectively by contactors or probe needles 11 and 12, which needles are disposed in line with one another, symmetrically about the transistor, and in a plane normal to the central or electrode parts of the transistor. The two needles are supported, respectively, by arms or levers 13, 14, each needle forming an integral, small hook at the free end of an approximately horizontal lever wire 15, 16 which forms one part of such a lever. Each of these lever wires has another end rigidly secured to a pair of resilient wires, jointly forming the other part of the respective lever, said wires diverging from adjacent the single wire 15 or 16 and having their free ends rigidly secured to a pivot bar. The two pivot bars are shown at 17, 18 and the pair of connecting wires is shown at 19, 20 for needle 11 and at 21, 22 for needle 12. The two levers or arms or wire structures 13, 14 are of substantially identical form; they are disposed in approximately horizontal planes, symmetrically above and below transistor 10; and they as well as the contact needles are electrically conductive.

Bars 17, 18 are made of electrically insulating material. They are pivoted on and balanced about horizontally disposed, parallel, longitudinal axes 23, 24, so that the bars, as such, are in neutral equilibrium. Each arm and bar, however, is equipped with adjustable unbalancing means, such as small screws 25, 26 threaded into the bars. These screws serve to gravitationally bias upper lever 13 and connected needle 11 downwardly with a static force of adjustable magnitude while biasing lower needle 12 and connected lever 14 upwardly with similar force.

The mass of each needle, lever and pivot bar structure is minute, in order to minimize non-symmetrical influences, such as friction in bearing sockets 27, 28 of the pivot bars and non-uniformity of time intervals required to overcome such friction. Accordingly, small screws 25, 26, having short moment arms about axes 23, 24, provide sufficient unbalance to cause positive and controllable contacting motions and to establish proper ultimate contact pressures of needles 11, 12. It will also be noted from the drawing that the entire arm and probe structure of each lever 13, 14 is formed of wires (Figure 1) all of which preferably are much thinner than the transistor (Figure 2). The length of said wires is relatively limited (Figure 4). The minute bulk of each complete lever unit, including pivot block 17 or 18, is just about sufficient to provide for reception of journal pin means 49, 50 (Figure 4) and of the minute weight adjusting set screws 25, 26, in the pivot block, and (Figures 1 and 2) for support of the probe needle 11 or 12, at some distance from the pivot block. It will thus be noted that each wire and probe structure has a mass which is many times smaller than that of its own pivot means, provided by bearing blocks 17 or 18, and even smaller than the mass of the small transistor 10.

When transistor 10 is withdrawn from the position shown, the two needles tend to contact one another; and the accuracy desired for semiconductor testing is such that the two needle points then come into head-on abutment, not for instance into parallel sliding motion. For this purpose the bearings of pivot bars 17, 18, including pin sockets 27, 28, are formed with great precision. Furthermore and for fully maintaining the precision alignment of the needles, the aforementioned divergent arrangement of connecting wire pairs 19, 20 and 21, 22 is advantageous, as it allows making the complete lever structures not only extremely light, but also relatively rigid in a horizontal plane and yet resilient in a vertical plane.

Horizontal rigidity is desirable since it helps to avoid the danger of impairment and loss of desired precision alignment of needles 11, 12, which loss may otherwise occur due to such temperature changes as must be expected in the absence of costly and complex thermal controls for the testing apparatus. This danger will be understood when it is considered that impingement of a needle point upon a solid body causes a variety of elastic stresses, including both torsion and other stresses in the needle-supporting lever. These several stresses, in conjunction with unavoidable inequality of thermal coefficients of elasticity, and of temperatures prevailing, could readily cause strain reactions leading to small lateral misalignment of one needle point relative to the other. The resulting misalignments might appear insignificant in terms of everyday measurements, but they could result in serious loss of precision and effectiveness in the semiconductor contacting operation. It is however necessary that the temporary contacts established for test purposes be of the same degree of precision as are the permanent contacts of modern transistors, not erratic like the contacts of early "crystal detectors."

In the vertical plane of lever movement, inequality of elastic response is less dangerous; for instance, inequality of torsional strain, relative to the longitudinal axis of the lever, evidently is of little significance for needle alignment in this latter plane. For this reason, and in order to keep the moving structures as light as possible, no further or reenforcing wires are used.

Figure 2 shows the way in which points 29, 30 of properly aligned needles 11, 12 face one another, when contacting opposite surfaces of transistor structure 10. The two points are here illustrated as having established contact with central portions of emitter and collector electrodes 31, 32, respectively. These electrodes, as mentioned, have previously been constructed; they may for instance consist of indium and/or an alloy thereof, plated or micro-alloyed to a central, thin, precision-formed transistor portion 33. This latter portion, wherein the critical processes of semiconductor operation occur, is often so thin and brittle that it can be perforated even by blowing air against it with moderate strength. It will thus be appreciated that extreme caution is required in contacting this portion, or the electrodes thereon, with testing probes consisting of needle points. Yet it is, of course, desirable to establish electrical contacts of low resistance between needle points 29, 30 and electrodes 31, 32 and accordingly to use substantial contact pressures. In terms of pounds per square inch of needle point surface these pressures would often be of astonishing magnitude. They can be safely applied only because of the smallness of the contact surface actually provided by such a needle point. In fact, it is at least sometimes preferred to use needle points of tapered shape with rounded ends, which can be produced for instance by an etching treatment applied to the needles.

When such a needle point—29 or 30—comes into contact with a surface of the central transistor structure 31, 32, 33 for the establishment of adequate contact pressure, and even if the motion is achieved only by a "static" force of uniform magnitude, such as the small, unbalanced weight of the needle and lever system, there occurs an impact which can have disastrous results, unless the impact stresses are channelled and absorbed with great care. The impact is either tantamount to a hammer blow, centrally delivered to a thin, brittle, only peripherally supported leaf or foil, or it constitutes at least the relatively forcible thrust of a rigid rod. Thus it seems unavoidable that an inherently dangerous process is used. Even if time were available for initially establishing contact of zero pressure and for then gradually building up positive contact pressure, in a "controlled" way, such controlled building up of pressure already presupposes the provision, by the present instrument of high contact pressure and low electrical resistance, in order that useful "control" can be derived from the contact area.

The mechanical impacts which are required in view of these conditions have now been prevented from causing harm; and this has been achieved by the combined use of several features of precaution. In the first place, a possibility has been provided to cause upper and lower impacts to occur simultaneously, with almost any desired degree of precision of impact timing. This timing can be adjusted very finely by means including screws 25, 26, as will be described more fully hereinafter. Additionally and in many cases—for instance when the needles contact the central structure 33, not through the medium of impact deadening and spreading electrodes 31, 32 but directly as is often necessary—the complete or partial crushing of solid material between the needle points must be avoided. This is one of the reasons for using rounded needle points, as described, and also one of the reasons in view of which it is preferred to use lever structures 13, 14 of minimum mass. If these structures were more massive, too much kinetic energy would often have to be dissipated in the semiconductor, upon the sudden stopping of the needles. On this ground, as well as for minimizing bearing friction and the like, it is preferred to use divergent wires 19, 20, etc. —not for instance a heavier leaf spring of equal resilience—to provide the horizontal rigidity which is desired for reasons already explained. The weight of the wire structure, as such, can then be of a low order of magnitude, generally similar to that of the transistor itself.

In order to insure simultaneous impingement, the initial spacing of needles 11, 12 from transistor 10 must be symmetrical, if and as the impact-retarding forces, such as friction of bearings 27, 28 and air resistance, are uniform. The mechanism used to obtain symmetrical spacing is schematically shown in Figure 1. It comprises two fingers 34, 35 horizontally extending across levers 13, 14, the first finger underlying lever 13 while the second overlies lever 14. These fingers are mounted on a holding structure schematically shown at 36 and which is pivoted about an axis 37 parallel to, equidistant from, and in the same plane with axes 23, 24. This arrangement allows symmetrical rocking motion, in one phase of which finger 34 and lever 13 are raised and finger 35 with lever 14 lowered, against the slight resistance of the lever moments provided with the aid of unbalancing screws 25, 26. Upon such tilting of levers 13, 14 the needles are symmetrically spaced from transistor 10.

A previously tested transistor 10 can then be withdrawn, without damage to the structure thereof or to the contacting needles; and a new transistor can now be inserted between the needle points, so that upon rapid reverse rocking of structure 36, the force of gravity, acting on the unbalanced lever structures is allowed to cause needles 11, 12 to approach one another, symmetrically and simultaneously, and now to establish contact of the needle points with the newly inserted transistor. When such contact has been established, electrical tests can be performed, with the aid of extremely thin, flexible, bare wires 38, 39, leading respectively from lever wires 19, 22 to stationary terminals 40, 41.

As indicated in Figures 3 and 4, a base plate 42 is provided, wherein said terminals 40, 41 are mounted. Associated circuitry is connected to the terminals by conventional, insulated conductor or cable means 43. The base plate is rigidly supported by structure 44, which also serves to mount guide means 45 for the holder 46 of a chuck 47, said chuck by means of base tab 48 supporting transistor 10 and thereby placing this transistor into an exactly predetermined position, which can then be matched by the contactor wire structure.

For this latter purpose, the bearing means of pivot bars 17, 18 are held in rigid frames 49, 50 which in turn are adjustably held in rigid sockets 51, 52, firmly mounted on base plate 42. Each socket 51, 52, has a central aperture 53 which is somewhat wider than a stem or shaft 54, disposed therein, said stem supporting the corresponding frame 49, 50. Two or more set screws 55, 56 are threaded into each socket member 52, at peripherally spaced points, so that stem 54 can be forced into various desired positions. In addition to the fine adjustment, so provided, a preliminary coarse adjustment or movement can of course be applied to each socket and frame, by suitable auxiliary structures, not shown.

Additionally mounted on base plate 42, opposite transistor holder guide 45, is a frame 57 which holds, by precision bearing means 58, a balanced lever plate 59 with the aforementioned fingers 34, 35 thereon. It will be seen that plate 59 and bearing means 58 provide the structure 36 and axis 37 schematically shown in Figure 1. It will further be noted from Figures 3 and 4 that pivoted plate 59 has a slot 60 wherein an actuating bar 61 is movable, said bar being pivoted to plate 59 and having a lower portion extending through a suitable aperture 62 in bottom plate 42. Therebelow, bar 61 can be manipulated for upward or downward motion, either by hand or by automatic solenoid or motor means or other power means, not shown. Desirably, frames 49, 50, 57 and parts mounted thereon are surrounded by a housing structure, formed for instance by transparent plastic walls 62, 63, 64 and 65 secured to base plate 42 and covered by transparent top member 66, to form a small transistor testing chamber 67 and thereby to protect wire levers 13, 14 from adverse influences, such as atmospheric draft.

In operation, levers 13, 14 are initially spread apart a few millimeters, symmetrically relative to transistor 10, by manually or automatically lowering control rod 61 and by thereby tilting plate 59 so as to lower finger 35 and raise finger 34. This requires at most a fraction of a second. Transistor holder 46 with transistor 10 thereon is then, within another fractional second, inserted on and stopped in proper position by structure 45, either manually or automatically. Thereupon, within a small interval of time such as ten milliseconds, rod 61 is raised, thereby substantially instantly releasing levers 13, 14. These levers now tilt, under the gravitational and accelerating influence of adjusted weights 25, 26, thereby ultimately—for instance after about fifty milliseconds—causing needles 11, 12 to impinge on the transistor structure.

By proper adjustment of biasing screws 25, 26 the impingement of both needles can be caused to occur substantially simultaneously; and by making proper adjustment of set screws 55, 56, desirably while observing needles 11, 12 under a microscope, impingement can be caused to occur at exactly the proper point. For this latter purpose, it is most convenient first to adjust the upper needle, while a transistor is in place, then to withdraw the transistor, and finally to adjust the lower needle to the exact position of the upper needle point. By virtue of the above-described arrangement of rigid and resilient parts, advantageously combined with precision bearings between relatively movable elements, the adjustments once achieved can be maintained with sufficient accuracy, even for the most minute and exacting work involved in the present type of fabrication.

Little need be said herein about electrical phenomena involved in the various tests which are performed with the aid of the contact needles. However, Figure 5 will be briefly described to explain some basic requirements of one of the test arrangements considered herein. Both needles 11, 12 are here in contact with transistor structure 10, thereby forming a circuit 68 which also includes electrical power means 69, manual or automatic test control switch 70 and test instrument circuitry 71, together with flexible wires 38, 39 and intermediate connectors as schematically shown. With such a test arrangement it is possible very rapidly to determine the thickness of a partly or fully etched-down transistor portion 33 (Figure 2), prior to the formation of the electrodes, or to determine the "punch-through voltage" of an electrode and base structure 31, 32, 33, prior to the lead-attaching and ensuing operations. Pursuant to the few fractions of a second, required for the establishment of test probe contacts, as described, these actual tests consume only little further time. It has been found possible without difficulty to integrate testing devices according to this invention with automatic transistor fabricating means wherein an interval of about five or six seconds is allowed for each fabricating or testing operation; and more rapid operation is possible for the test unit.

Other tests, including those known as "avalanche breakdown voltage" tests, can in some cases be performed with the arrangement shown in Figure 6, wherein only one of the probe needles, as shown needle 11, is in contact with transistor 10, the other needle 12 being prevented from such contact by suitable adjustment of corresponding set screws 55, 56 (Fig. 4). In this position (Figure 6) reliance is placed on a circuit generally identified by numeral 72 and which includes needle 11, transistor 10, base tab 48, power source 73, test switch 74 and test instrument circuitry 75. It may be necessary, however, to bring both needles into contact with the transistor in order to avoid the danger of mechanical breakage, as described above. The breakdown voltage test can still be performed; needle 12 can be left electrically unconnected.

Still other tests can be applied when for instance one side of transistor 10 has been provided with a whisker wire 76. Such wire can now be contacted, for instance by lever wire 16, while the opposite side of the transistor structure may be contacted directly, without interposition of a whisker, by needle 11. In such cases, circuit 77 may include power source 78, test switch 79, and a third type of test instrument circuitry 80. In this latter case the adjustment of lever wires 15, 16, as indicated, may have to be somewhat different from that used in Figure 5, but in a general sense, the contact needles are still aligned.

While only a single embodiment of the invention and three general circuit systems for the same have been described, it should be understood that the details thereof are in no way to be construed as limitative of the invention, except insofar as is consistent with the scope of the following claims.

The invention is claimed as follows:

1. In apparatus for contacting a small and delicate article: means for holding said article; a probe structure comprising an arm, a needle carried by and extending transversely of one end of the arm, and pivot means on the other end of the arm, the needle being directed, in a normal position of the probe structure, toward said article, and the arm and needle having a total mass which is small in comparison with that of said pivot means; biasing means carried on said probe structure and gravitationally biasing it to move said needle, about said pivot means, into point contact with said article; and linkage, separate from said probe structure so as not to add to the small mass of the arm and needle, but releasably engageable with the probe structure in such a way that, upon engagement of the linkage with said probe structure, said contact of said needle with said article is broken and, upon release of such engagement, said gravitational biasing again moves said needle into such contact.

2. Apparatus as described in claim 1 wherein said pivot means consists of a bar, supporting said other end of the arm, and said biasing means consists of a weight, adjustably secured to said bar, whereby said gravitational biasing can be adjusted.

3. Apparatus for electrically testing small and fragile semiconductor wafers, comprising: means for holding such a wafer; an electrically conductive arm, including a needle point on one end thereof, the arm being pivoted at the other end thereof, the needle point being directed transversely of the arm, to face, in a normal position of the arm, toward a portion of a surface of said wafer, and the arm having a total mass which is smaller than that of said small wafer; biasing means on said arm, gravitationally biasing it to move said needle point into contact with said surface portion; means for establishing, upon contact of said needle point with said surface portion, an electrical test circuit including the conductive arm and at least part of the semiconductor wafer; and a device releasably engageable with said arm for breaking said contact and thereafter permitting subsequent new establishment thereof.

4. Apparatus as described in claim 3 wherein said arm and needle point consist of an integral, metallic wire structure.

5. Apparatus for contacting a small article of delicate structure, such as a semiconductor blank, comprising: means for holding said article; a pair of probes, disposed above one another, each including an arm and a needle point carried on one end of the arm and extending transversely thereof, the arm and needle point having a total mass which is small in comparison with that of said article; a pivot at the other end of each arm disposed so that the two needle points are directed, in a normal position of the probe, toward opposite sides of said article; biasing means carried on each probe and gravitationally biasing it to move the respective needle point into contact with said article; and unitary control linkage, separate from said probes so as not to add to the small mass thereof, but including a pair of rigidly interconnected bars, each releasably engageable with one probe, in such a way that in one operation of the control linkage said contact of both needle points with the article is simultaneously broken and, in a subsequent operation of the control linkage, said gravitational biasing moves both needle points, simultaneously, into such contact.

6. Apparatus as described in claim 5 wherein said linkage comprises a pair of fingers, one extending closely below the upper arm and the other closely above the lower arm; a single bar rigidly interconnecting said fingers; and means for tilting said single bar.

7. Apparatus for contact-testing small articles such as transistors and the like, comprising: means for holding such an article; a bearing block spaced from said holding means; a probe unit substantially consisting of a skeleton of thin wires, elongate in one direction, to provide an arm which is journalled on the bearing block and extending therefrom to adjacent the holding means, a wire of said skeleton continuing at an angle to said direction to provide a needle, on the free end of the arm, said needle being directed, in a normal position of the probe unit, toward said article, and the complete skeleton of wires having a mass which is minute in comparison with that of said bearing block; means biasing the probe unit to move said needle into point contact with said article; and control rod means, separate from said skeleton of wires so as not to add to the small mass thereof, but releasably engageable with said probe unit to alternately allow and overcome said biasing.

8. Apparatus as described in claim 5 wherein said skeleton of wires is Y-shaped, the leg of the Y being integral with said needle and the arms of the Y being secured to said bearing block.

References Cited in the file of this patent
UNITED STATES PATENTS

| | | |
|---|---|---|
| 1,507,287 | Holliday | Sept. 2, 1924 |
| 2,872,645 | Santamaria et al. | Feb. 3, 1959 |